United States Patent
Ulmer

(10) Patent No.: US 9,936,676 B1
(45) Date of Patent: Apr. 10, 2018

(54) ANIMAL IDENTIFICATION TAG

(71) Applicant: Arrow Tag, LLC, Mobridge, SD (US)

(72) Inventor: Kim G. Ulmer, Mobridge, SD (US)

( * ) Notice: Subject to any disclaimer, the term of this patent is extended or adjusted under 35 U.S.C. 154(b) by 0 days.

(21) Appl. No.: 15/670,176

(22) Filed: Aug. 7, 2017

(51) Int. Cl.
*A01K 11/00* (2006.01)
*G09F 3/08* (2006.01)

(52) U.S. Cl.
CPC ............. *A01K 11/004* (2013.01); *G09F 3/08* (2013.01)

(58) Field of Classification Search
CPC ........................... A01K 11/001; A01K 11/004
See application file for complete search history.

(56) References Cited

U.S. PATENT DOCUMENTS

| | | | | |
|---|---|---|---|---|
| 421,680 | A * | 2/1890 | Nagy | A01K 11/001 24/105 |
| 4,059,074 | A * | 11/1977 | Furer | A01K 11/001 119/655 |
| 4,121,591 | A | 10/1978 | Hayes | |
| 4,359,015 | A * | 11/1982 | Ritchey | A01K 11/004 119/655 |
| 4,516,577 | A | 5/1985 | Scott et al. | |
| 4,748,757 | A * | 6/1988 | Howe | A01K 11/001 40/301 |
| 5,234,440 | A | 8/1993 | Cohr | |
| 5,308,351 | A * | 5/1994 | Nehls | A01K 11/004 40/300 |
| 6,021,592 | A * | 2/2000 | Caisley | A01K 11/001 40/301 |
| 6,098,324 | A * | 8/2000 | Nepote | A01K 11/004 40/300 |
| 6,235,036 | B1 | 5/2001 | Gardner et al. | |
| 9,215,862 | B2 | 12/2015 | Bladen et al. | |
| 2002/0148146 | A1* | 10/2002 | Hogan | A01K 11/004 40/301 |
| 2007/0101626 | A1 | 5/2007 | Connole | |
| 2009/0077844 | A1* | 3/2009 | van Wijk | A01K 11/006 40/300 |
| 2009/0078762 | A1* | 3/2009 | Forster | A01K 11/001 235/385 |
| 2011/0270266 | A1 | 11/2011 | Ritchey et al. | |
| 2011/0270267 | A1 | 11/2011 | Ritchey et al. | |
| 2012/0030977 | A1* | 2/2012 | Knapp | A01K 11/001 40/301 |
| 2012/0285056 | A1* | 11/2012 | Corrales, Jr. | A01K 11/004 40/301 |

(Continued)

OTHER PUBLICATIONS eartagcentral.com, "840 EID (RFID) Tags", Accessed from the Internet: http://eartagcentral.com/home.php?cat=258 on Jul. 7, 2017, pp. 1-6.

(Continued)

*Primary Examiner* — Gary C Hoge
(74) *Attorney, Agent, or Firm* — Pederson IP, LLC

(57) ABSTRACT

An identification tag for an animal is provided. The tag includes a male portion defining a shaft, an enlarged portion proximate a first end of the shaft, and one or more sharp edges on a second end of the shaft. The one or more sharp edges are oriented to cut a pathway for the shaft through material contacting the second end of the shaft. The tag also includes a female portion defining a recess. The recess is configured to connect to the second end of the male portion.

24 Claims, 2 Drawing Sheets

(56) References Cited

U.S. PATENT DOCUMENTS

2013/0175347 A1* 7/2013 Decaluwe ............ A01K 11/004
235/492
2013/0204159 A1 8/2013 Destoumieux et al.

OTHER PUBLICATIONS eartagcentral.com, "840 Visual Tags", Accessed from the Internet: http://eartagcentral.com/home.php?cat=310 on Jul. 7, 2017, pp. 1-5.
eartagcentral.com, "Electronic (EID) Identification", Accessed from the Internet: http://eartagcentral.com/home.php?cat=250 on Jul. 7, 2017, pp. 1-7.
eartagcentral.com, "Official USDA Swine Premise (PIN) Tags", Accessed from the Internet: http://eartagcentral.com/home.php?cat=340 on Jul. 7, 2017, pp. 1-2.
eartagcentral.com, "Taggers and Accessories", Accessed from the Internet: http://eartagcentral.com/home.php?cat=251 on Jul. 7, 2017, pp. 1-5.
eartagcentral.com, "Visual ID Tags", Accessed from the Internet: http://eartagcentral.com/home.php?cat=249 on Jul. 7, 2017, pp. 1-11.
Hid Global, "Animal ID", Accessed from the Internet: https://www.hidglobal.com/products/rfid-tags/identification-technologies/glass-tags-animals on Jul. 7, 2017, pp. 1-4.
Interpuls S.P.A., "Heat Detection & Eating Monitoring", Accessed from the Internet: http://www.interpuls.com/products/automation/heat-detection-eating-monitoring.html on Jun. 12, 2017, pp. 1-6.
Ketchum Manufacturing Inc., "Livestock Supplies", Accessed from the Internet: http://www.ketchum.ca/catalogues on Jul. 7, 2017, pp. 1-28.
Ketchum Manufacturing Inc., "Meat & Poultry Processing", Accessed from the Internet: http://www.ketchum.ca/catalogues on Jul. 7, 2017, pp. 1-20.
Ketchum Manufacturing Inc., "Seafood Marketing & Identification Products", Accessed from the Internet: http://www.ketchum.ca/catalogues on Jul. 7, 2017, pp. 1-20.
Kupsan Tag Company, "Product Catalogue", Accessed from the Internet: http://www.kupsan.net/electronic-ear-tags.html on Jul. 7, 2017, pp. 1.
Livestock Concepts, "Bock's Dewlap Boc-Loc Brisket Tags—Blank", Accessed from the Internet: http://livestockconcepts.com/en/identification/434-bock-s-dewlap-boc-loc-brisket-tags-blank.html on Jul. 7, 2017, pp. 1-2.
Livestock Concepts, "Bock's Toggle Punch", Accessed from the Internet: http://livestockconcepts.com/en/identification/2672-bock-s-toggle-punch.html on Jul. 7, 2017, pp. 1-2.
U.S. Patent and Trademark Office, "Office Action", U.S. Appl. No. 15/670,215, dated Dec. 29, 2017, pp. 1-11.

* cited by examiner

ANIMAL IDENTIFICATION TAG

BACKGROUND

Identification tags, known simply as "ID tags", are ubiquitous in livestock farming. In many cases multiple ID tags are present on a single animal. For example, a first ID tag may be used to attach a government (e.g., state) ID to an animal, a second ID tag may be used to attach an owner ID to the animal, and a third ID tag may be used to attach an organizational ID (e.g., for the meat and livestock association (MLA)). Other ID tags may be used to attach other identifiers to an animal.

ID tags can include a large surface for displaying of a visual identifier, usually a number or combination of numbers and letters, and/or can include a radio frequency identification (RFID) circuit. When energized, the RFID circuit emits a signal including an identification number for the animal. RFID circuits can also store and transmit other information such as the properties at which an animal has been located.

Ear Tags

Most ID tags are designed for and attached to an ear of the animal. The ear is used primarily because the flap of the ear is a large exposed area of thin skin with few blood vessels or nerves allowing for relatively easy attachment and minimal discomfort for the animal. These "ear tags" are attached by making an opening through the flap of the ear and placing a narrow neck portion of the tag through the opening. Respective enlarged portions are on each end of the neck of the tag and are positioned on respective sides of the ear to prevent the tag from sliding out of the opening. The ear tags are placed over a thin rib of cartilage on the ear.

Ear tags come in one-piece and two-piece designs. The two-piece designs include a first piece with a neck having one enlarged portion on one end and a separate second piece having a second enlarged portion. The neck of the first piece can be inserted through the opening in the ear flap, and the second piece can subsequently be connected to the free end of the neck on the side of the ear opposite the first enlarged portion. The one-piece designs typically include a hinged member that can align with the neck to be slid through the opening in the ear flap and is subsequently rotated perpendicular to the neck to prevent the neck from sliding back through the opening once the tag is attached to the ear.

The ear tag is attached through the use of an attachment tool. The attachment tool is often a pliers-like hand squeezed/powered implement that brings two opposing surfaces together with the ear flap therebetween. The ear tag is placed on one opposing surface (or both in a two-piece design) of the tool and is pressed, using the tool, through the ear flap of the animal. Inserting through the ear flap requires only a single penetration of thin skin and cartilage, so it is easy to insert the tags with a hand powered tool. Other attachment tool designs exist including a pneumatic design that uses air pressure to force an ear tag through the ear flap.

The opening in the ear flap is typically made simultaneously with attachment of the ear tag. The attachment tool can have a pointed end that sticks out in front of the tag (e.g., through an aperture extending longitudinally through the neck of the tag) to create an initial opening. Alternatively, the tag itself can have a rigid pointed end to create an initial opening. This initial opening is typically smaller than a diameter of the neck of the tag. The initial opening is enlarged by forcing a cone shaped end of the neck portion of the tag into and through the initial opening. This action enlarges the initial opening and pushes the neck portion through that enlarged opening. Once the neck portion extends sufficiently out of the reverse side of the ear flap, the second piece can be attached to the neck, or the hinged portion can be rotated, to prevent the neck from being pulled back out of the opening. Often, attachment of the female portion or rotation of the hinged portion is accomplished by the attachment tool during the same movement of the opposing surfaces towards each other that creates the opening and presses the neck through. This results in creation of the opening and complete attachment of the ear tag with a single squeeze of the attachment tool.

Other Tags

ID tags can also be attached to animals in other locations including under the skin (for RFID tags), as necklaces, ankle bracelets, and in the brisket region of a cow. A tag attached in the brisket region of a cow, a so-called "brisket tag", resembles a padlock with a U-shaped metal bar that extends through an opening made in the brisket region of a cow. A plastic member attaches to the free ends of the U-shaped bar to provide a block that prevents the U-shaped bar from sliding out of the opening. The plastic member also provides a surface for disposing of a visual identifier. To attach the brisket tag, the hair in the brisket region at which the opening is to-be-made is shaved, and a punch pliers is used to punch an opening through the flap of skin. A U-shaped metal bar is then placed through the opening and the plastic member is attached to the ends of the U-shaped bar.

As compared to an ear tag, a brisket tag can provide a higher degree of security as ear tags can be surreptitiously cut or pulled-out of an ear. The brisket tags, however, can be much more difficult to attach, because of the multiple steps required including shaving the skin, creating the opening, inserting the U-bar through the opening, and securing the U-bar. Additionally, the skin in the dewlap or brisket region is much more difficult to penetrate than the ear flap. Oftentimes, the skin in the dewlap or brisket region is folded such that making a hole requires penetrating through two layers of the thick skin. Additionally, the brisket region of the cow can be less accessible than an ear flap of the cow. Attachment of brisket tags can also be difficult because it can be difficult to re-locate the opening in the flap of skin for inserting of the U-bar after the opening is created with the punch. Finally, brisket tags can be problematic in that the U-shaped bar in combination with the plastic member forms a ring in which other items can get caught, such as material of a fence. If a brisket tag does get caught in a fence, it may be ripped out when the cow moves away, causing both pain to the cow and loss of the tag.

BRIEF DESCRIPTION

Embodiments for an identification tag for an animal are provided. The tag includes a male portion defining a shaft, an enlarged portion proximate a first end of the shaft, and one or more sharp edges on a second end of the shaft. The one or more sharp edges are oriented to cut a pathway for the shaft through material contacting the second end of the shaft. The tag also includes a female portion defining a recess. The recess is configured to connect to the second end of the male portion.

Other embodiments include for an identification tag for an animal. The tag includes a male portion defining, an elongated member and a head proximate a first end of the elongated member. The male portion also defines a cutting member on a second end of the elongated member and a middle portion of the elongated member between the head and the cutting member. The tag also includes a female portion that engages the second end of the male portion to secure the female portion to the male portion. One or more of a radio frequency identification (RFID) circuit, and a label surface having an area of at least a 1 square inch for disposing of a visual identifier are also included.

Yet other embodiments include an identification tag for an animal. The tag includes a first structure for connecting to a second structure. The first structure includes an elongated member configured to cut through skin in a dewlap or brisket region of a cow. The second structure is configured to connect to a free end of the first structure while the first structure extends through the skin to secure the tag to the cow.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Inventive Tag

Figure 1:
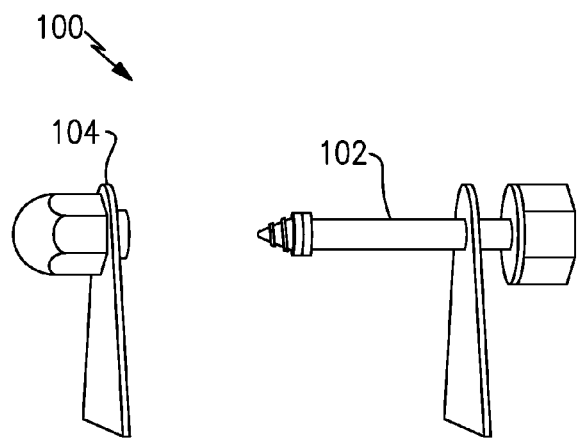
FIG. 1 is a perspective view of an example animal identification tag that provides increased security and is easy to attach.

FIG. 1 is a perspective view of an example animal identification tag 100 that provides both increased security and is easy to attach. The tag 100 includes a male portion 102 and a female portion 104 that can be connected to the male portion 102 during attachment of the tag 100 to an animal. The tag 100 can be attached to the dewlap or brisket region of a cow.

Male Portion

Figure 2:
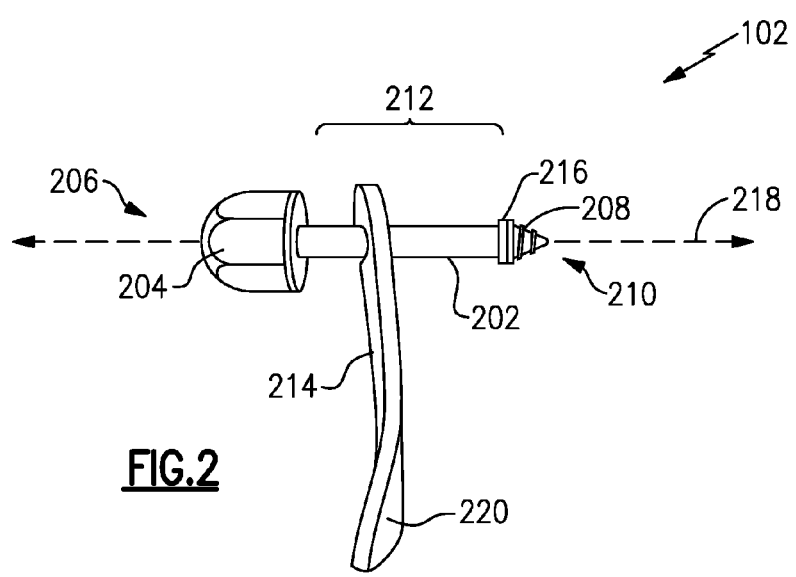
FIG. 2 is a perspective view of an example male portion of the tag of FIG. 1.

FIG. 2 is a perspective view of the male portion 102 of the tag 100. The male portion 102 includes a shaft 202 having an enlarged head 204 proximate a first end 206 of the shaft 202 and one or more sharp edges 208 on a second end 210 of the shaft 202. The shaft 202 can be rigid and straight. The shaft 202 of the male portion 102 can be inserted through a flap of skin in the dewlap or brisket region of a cow during attachment of the tag 100. The one or more sharp edges 208 enable the male portion 102 to cut its own opening/pathway through the flap of skin. Thus, a user attaching the tag 100 does not need to form an opening with a separate device and then re-locate the opening to install the tag, as is the case for conventional brisket tags. In contrast, the male portion 102 itself creates the opening in the flap of skin. The male portion 102 both creates the opening and is inserted through the opening in the same motion. The one or more sharp edges 208 are configured to cut through a flap of cow skin that comes into contact with the second end 210 to the shaft 202 to make an opening therethrough. The one or more sharp edges 208 are oriented to cut through the flap while the shaft 202 is positioned approximately normal to the flap of skin. The one or more sharp edges 208 are sufficiently sharp and large to cut through the tough and loose skin of the dewlap or brisket region of a cow.

The cow skin/leather in of the dewlap or brisket region is thicker and substantially tougher than the skin and cartilage in an ear flap of a cow. Moreover, the leather in the dewlap or brisket region of a cow is often folded, requiring multiple layers of the skin to be penetrated through in order to attach the tag 100. Accordingly, the simple pointed ends of ear tags are not able to reliably pierce the skin/leather in the dewlap or brisket region of a cow. One reason that a simple pointed end does not work well is that a pointed end only makes a tiny penetration (at most) into the skin. The ear tag design then relies on force applied by the smooth cone shaped end proximate the pointed end to press open the tiny penetration to create a hole large enough for the neck of the ear tag to extend through. The skin/leather in the dewlap or brisket region, however, is sufficient tough that expanding a tiny penetration with a cone through force alone does not work reliably.

Advantageously, the tag 100 disclosed herein has one or more sharp edges 206, which can efficiently cut through the tough skin/leather of the dewlap or brisket region. Being edges, the one or more sharp edges 206 are an extended structure that cuts across the skin rather than merely piercing into the skin. By cutting across the skin, the one or more sharp edges 206 enable better penetration into the skin than a pointed end alone and also create a wider hole so that the tag 100 does not have to rely on force to enlarge the hole as much as a pointed end tag does. Thus, the tag 100 with the one or more sharp edges 206 is able to reliably create an opening through the tough skin/leather of the dewlap or brisket region of a cow. For example, the male portion 104 with the one or more sharp edges 208 can cut through both the left and right sides of the brisket dewlap at the same time and in the same spot. Once the male portion 104 has cut through the entire dewlap/brisket, the female portion 104 can be immediately attached. The tag 100 can be installed anywhere in the dewlap or brisket region which extends along the front of the cow generally from the bottom of the neck down to the start of the front legs. This area can be up to 25 inches long. The tag 100 may be suitable for attachment to other areas as well. The male portion can be pushed through the dewlap or brisket region with the aid of a hand powered tool, such as one having a hand pumping action or one with a hand crank, or can be powered by an electric, pneumatic or other motor.

The one or more sharp edges 208 and the shaft 202 can be a monolithic piece of material (e.g., metal, plastic, ceramic) or the one or more sharp edges 208 can be attached to the shaft 202 in an appropriate manner. In an example, the one or more sharp edges 208 are attached to the shaft 202 in a permanent manner; that is, in a manner in which the one or more sharp edges 208 are not intended to be disconnected from the shaft 202. Such a permanent connection can include a bonded, glued, soldered, or welded connection. In another example, the one or more sharp edges 208 are attached to the shaft 202 in a non-permanent manner; that is, in a manner in which the one or more shaft edges 208 are intended to be disconnected from the shaft 202. Such a non-permanent connection can include a threaded or pinned connection.

Shaft of Male Portion

The shaft 202 also defines a flange 216 proximate the second end 210 thereof. The flange 216 is a projection that extends outward on the shaft 202. In this example, the flange 216 extends outward around the entire circumference of the shaft 202. The flange 216 is disposed adjacent the one or more sharp edges 204 and aids in connecting the male portion 102 to the female portion 104 as is explained below.

Head of Male Portion

The head 204 of the male portion 102 is an enlarged portion that extends radially outward, relative to a longitudinal axis 218, from the shaft 202. The head 204 extends radially outward farther than a middle portion 212 of the shaft 202 and acts as a stop to prevent the male portion 102 from passing through the opening formed in the skin any further than the head 204. The head 204 can also provide a means to grasp the male portion (e.g., by an attachment tool) during attachment to the animal. In this example, the head 208 extends outward around the entire circumference of the shaft 202. In other examples, the head 208 can include one or more discontinuous projections that extend outward around the various portions of the circumference of the shaft 202. In the example shown in FIG. 2, the head 208 has a hexagonal right prism geometry such that the head 204 (and corresponding male portion 102) can be mated with and twisted by a matching socket. Other geometries for the head 208 can also be used including a square or other right prism. In other examples, the head 204 can define a socket (e.g., a hex or star shaped socket) such that the head 204 can be mated with and twisted by a matching bit. There are many geometries that may be suitable for the head 208 and any suitable geometry for the application can be used.

Middle Portion of Shaft

The middle portion 212 of the shaft 202 extends between the head 204 and the one or more sharp edges 208. The middle portion 212 is free of sharp edges on its outer surface as it is intended to be in contact with the animal (i.e., the skin forming the opening) while the tag 100 is attached to the animal. As such, the middle portion 212 is designed to not cut into the skin, and to provide minimal irritation to the animal. In the example shown in FIG. 2, the middle portion 212 has a cylindrical geometry with a smooth surface, which enables easy sliding of the middle portion 212 through the opening formed by the one or more sharp edges 208. Cross-sectional shapes other than circular can be used for the middle portion 212 including, square, hexagonal, etc.

The middle portion 212 can have a generally consistent diameter along its length from the one or more sharp edges 208 to the head 204, which also enables the middle portion 212 to slide easily through the opening. In the example shown in FIG. 2, excluding the flange 216, the diameter of the middle portion 212 is constant across its length. In other examples, the diameter of the middle portion 212 varies within about 0.5 inches across its length. The one or more sharp edges 208 are configured to create an opening having a diameter similar to the cross-section of the middle portion 212 of the shaft 202. Creating an opening having such a similar diameter enables the middle portion 212 of the shaft 202 to slide through the opening, while being too small for the head 204 of the shaft 202 to fit through. To create an opening having a similar diameter to the middle portion 212, a largest distance of opposing portions of the one or more sharp edges 208 can be similar to the diameter of the middle portion 212. In an example, the largest distance of opposing portions of the one or more sharp edges 208 is less than 0.25, or less than 0.5 inches, different than a diameter of the middle portion 102. In an example, the diameter of the middle portion 212 is in the range of 0.5 inches to 1.5 inches.

The length of the middle portion 212 of the shaft 202 (distance from the head 208 to the one or more sharp edges 208) is sufficient to extend completely through the opening created in the flap of skin on the dewlap or brisket of a cow from one side of the flap to the other side of the flap. This length can range from 0.5 inches to 5 inches, or in another example from 1 to 3 inches. The one or more sharp edges 208 need only extend along the shaft 202 a distance sufficient to cut an opening through the skin and do not extend into the middle portion 212 of the shaft 202. In an example, the one or more sharp edges 208 extend less than 1 inch in longitudinal dimension (parallel with the longitudinal axis 218) along the shaft 202. In the example shown in FIG. 2, the one or more sharp edges 208 have a helical form that spirals around the shaft 202. The length of the one or more sharp edges 208 following their spiral around the shaft 202 is, of course, longer than the longitudinal distance (parallel with the longitudinal axis 218) traversed by the edges 208 along the shaft 202. In another example, the one or more sharp edges 208 extend less than 0.5 inches in the longitudinal dimension along the shaft 202. In yet another example, the one or more sharp edges 208 extend less than 0.25 inches in the longitudinal dimension along the shaft 202.

Stop Surface of Male Portion

To act as a stop which prevents the male portion 102 from sliding any further through the opening in the flap of skin, the head 204 can extend outward at least 0.5 inches from the middle portion 212. That is, the head 204 can have a diameter at least 1 inch larger than a diameter of the middle portion 212. The head 204 can extend outward on opposing sides of the middle portion 212 and/or in an otherwise distributed manner around the middle portion 212 to provide a sufficient stopping surface. In an example, the head 204 extends out around the entire circumference of the middle portion 212 as is shown in FIG. 2.

Label Surfaces(s) of Male Portion

The male portion 102 can also include a label surface 214 for disposing of a visual identifier. The label surface 214 is a surface having a sufficient size, geometry, and location to allow one or more symbols disposed thereon to be viewed by a user while the tag 100 is attached to an animal. In the example shown in FIG. 2, the label surface 214 is a generally planar surface that extends (e.g., hangs) from the shaft 202 of the male portion 102. The label surface 214 is preferably at least 1 square inch in area to allow for symbol(s) of a sufficient size to be placed thereon, such that the symbol(s) can be viewed from a reasonable distance (several feet) by an unaided observer. The generally planar geometry of the label surface 214 enables easy application of the symbol(s) (e.g., if they are written by hand) and allows all symbols on the surface 214 to be viewed by an observer from a single direction.

As shown, a second label surface 220 can exist reverse of the first label surface 214. The second label surface 220 can be used to display the same identifier as present on the first label surface 214, such that a common identifier is viewable by an observer from either side of the tag 100. The second label surface 220 can be generally planar.

Figure 3:
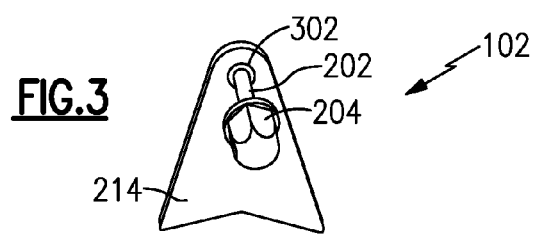
FIG. 3 is another perspective view of the male portion of FIG. 2.

FIG. 3 is another perspective view of the male portion 102. As shown in FIG. 3, the example label surface 214 has an aperture 302 and the shaft 202 of the male portion 102 is inserted through the aperture 302. The aperture 302 has a slightly larger diameter than the external diameter of the shaft 202. In an example, the aperture 302 is sufficiently larger than the external diameter of the shaft 202 such that the label surface(s) 214, 220 can rotate freely on the shaft 202.

With the label surface(s) 214, 220 rotating freely, the label surface(s) 214, 220 can hang downward from the shaft 202 while the tag 100 is attached to an animal regardless of the rotational orientation of the shaft 202. Allowing the label surface(s) 214, 220 to rotate freely on the shaft 202 also enables the shaft 202 to be rotated (i.e., during attachment to the animal) without having the label surface(s) 214, 220 rotate along with the shaft 202. Instead, the label surface(s) 214, 220 can hang freely while the shaft 202 is rotated, which enables both easier rotation of the shaft 202 and reduces the safety hazard of having the projecting label surface(s) 214, 220 being spun around rapidly. In an implementation of this example, the label surface 214(s) 220 can be removed from the shaft 202, and other label surfaces can be inserted onto the shaft 202, by sliding the label surfaces 214, 220 on/off the shaft 202 over the second end 210 thereof, while the male portion 102 is disconnected from the female portion 104.

In another example, the label surface 214 is secured to the shaft 202 such that the label surface 214 rotates with the shaft 202. The cross-sectional shape of the example label surface(s) 214, 220 shown in FIG. 2 is generally triangular, however, any suitable cross-sectional shape can be used.

Helical Sharp Edge(s)

Figure 4:
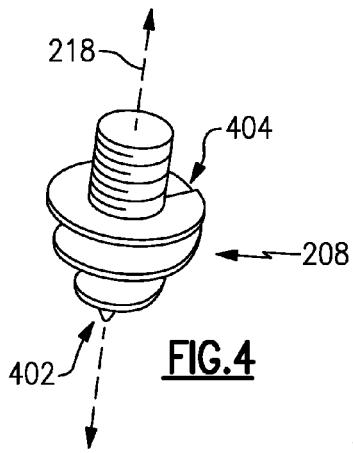
FIG. 4 is an enlarged perspective view of an example one or more sharp edges for an end of the male portion of FIG. 2.

FIG. 4 is an enlarged perspective view of an example one or more sharp edges 208 for the second end 210 of the male portion 102. The example one or more sharp edges 208 shown in FIG. 4 have a helical form. As shown, the helical form increases in diameter from a tip 402 to a base 404. When disposed on the male portion 102, the base 404 is proximate the middle portion 212 of the shaft 202 and the tip 402 is distal the middle portion 212. The increasing diameter of the helical form enables the one or more sharp edges 208 to start cutting into the skin with the tip 402 and increase the diameter of the opening as the one or more sharp edges 208 cut further into the skin. The distance between the one or more sharp edges 208 on opposing sides proximate the base 404 is similar to (e.g., within 0.5 inches of) the diameter of the middle portion 212 of the shaft 202, such that the final opening created by the one or more sharp edges 208 has a diameter similar to the diameter of the middle portion 212. In this example, a single sharp edge is used for the helical form. In other examples, however, more than one sharp edge can be included.

Broadhead Sharp Edges

Figure 5:
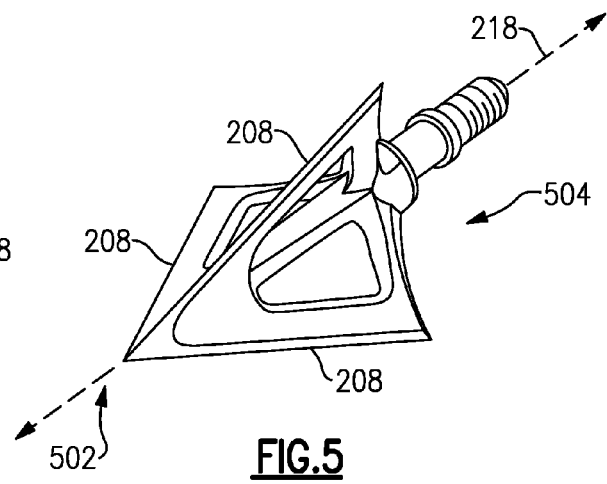
FIG. 5 is an enlarged perspective view of another example one or more sharp edges for an end of the male portion of FIG. 2.

FIG. 5 is an enlarged perspective view of another example one or more sharp edges 208 having a form of a broadhead of an arrow. Here, the one or more sharp edges 208 extend longitudinally from a tip 502 to a base 504. The example shown in FIG. 5 includes three sharp edges 208, however, any number of sharp edges 208 can be included. The sharp edges 208 are straight edges that come together to form a point at the tip 502 and are angled radially outward (with respect to the central longitudinal axis 218) from the tip 502, such that the ends of each edge 208 at the base 504 are farther from the central longitudinal axis 218 of the shaft 202 than the ends of each edge at the tip 502. Thus, the edges 208 can initially pierce the skin with the pointed tip 502 and cut a wider opening as the edges 208 extend further into the skin. Similar to the helical form edges, the distance between opposing edges at the base 504 of the broadband form edges can have a diameter similar to the diameter of the middle portion 212 of the shaft 202. Other geometries of one or more sharp edges 208 are also possible.

Female Portion

Figure 6:
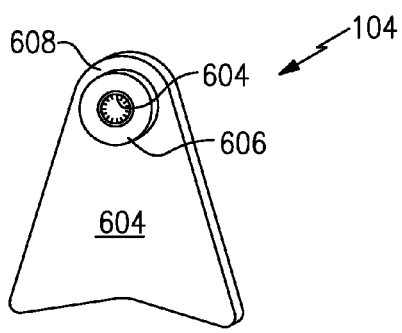
FIG. 6 is a perspective view of an example female portion of the tag of FIG. 1.

FIG. 6 is a perspective view of a female portion 104 of the tag 100, showing a first side thereof. The female portion 104 defines a recess 602 on the first side, that mates with the second end 210 of the male portion 102. The size and geometry of the recess 602 corresponds to the size and geometry of the second end 210 of the male portion 102. The recess 602 and the second end 210 of the male portion 102 connect to one another in a manner such that the female portion 104 cannot be easily pulled apart from the male portion 102. The connection should be strong enough that the female portion 104 does not inadvertently come apart from the male portion 102 during the normal activities of the animal.

Attachment of Male Portion to Female Portion

In an example, the male portion 102 with one or more sharp edges 208 having a helical form is screwed into the material of a bottom and/or sides of the recess 602 to connect the male portion 102 to the female portion 104. For example, the bottom and/or sides of the recess 602 can be composed of a plastic material and the male portion 102 can be rotated such that the one or more sharp edges 208 cut into and engage with the bottom and/or sides of the recess 602 like a screw.

Tamperproof Connection

In an example, the connection between the male portion 102 and the female portion 104 is a tamperproof connection. The tamperproof connection is a single-use connection, which provides confidence that the tag 100 or one of the male portion 102 and female portion 104 respectively can only be used for a single animal. Such a tamperproof connection can be used on a tag for any purpose, but may be especially desirable for government tags, such as EID-type tags. With a tamperproof tag 100 on an animal, one can be assured that a government ID on that tag 100 is the correct government ID assigned to that animal.

As a single use connection, the male portion 102 and the female portion 104 are configured such that they can be connected only a single time—subsequent connections will fail or be significantly impaired. One implementation of the single-use connection is the breaking of one or more tabs 606 of the female portion 104, such that the female portion 104 cannot be re-used or is significantly impaired from re-use. The one or more tabs 606 can extend into the recess 602 of the female portion 102 from the sidewalls thereof. The one or more tabs 606 can contact the flange 216 extending from the male portion 102 during connection of the male portion 102 to the female portion 104. The flange 216 can have a diameter that is slightly larger than a distance between the one or more tabs 606 and an opposing member (e.g., wall or other tab) of the recess 602. With the flange's 216 diameter larger than a distance between the one or more tabs 606 and an opposing member (e.g., wall or other tab 606) in the recess 602, the flange 216 contacts the one or more tabs 606 as the second end 210 of the male portion 102 moves into the recess 602 of the female portion 104 during connection of the female portion 104 to the male portion 102. This contact between the flange 216 and the one or more tabs 606 flexes the one or more tabs 606 forward (towards a bottom of the recess 602) to allow the flange 216 to pass by the one or more tabs 606. As the flange 216 continues to move further into the recess 602, the flange 216 will pass by the one or more tabs 606, at which point the flange 216 will be positioned inward of the one or more tabs 606. The one or more tabs 606 can allow such forward flexing to allow the flange 216 to pass by during insertion of the male portion 102. The contact between the one or more tabs 606 and the flange 216 while the flange 216 is behind (i.e., inserted past) the one or more tabs 606, can hold the male portion 102 together with (i.e., connected to) the female portion 102.

During extraction of the flange 216 from the recess 602 during disconnection of the female portion 104 from the male portion 102, the one or more tabs 606 can break in response to contact with the flange 216 pushing the one or more tabs 606 backward. After the one or more tabs 606 break during disconnection of the male portion 102 from the female portion 104, the female portion 104 can no longer adequately be re-connected to the male portion 102, because the tabs 606 are no longer present and/or long enough to provide sufficient contact to the flange 216 to hold the male portion 102 and the female portion 104 together. Thus, the female portion 102 is configured to allow only a single connection, making it difficult for the female portion 104 of the tag 100 to be detached from one animal and re-attached to another animal. This provides increased security to the tag 100, as one can be confident that the female portion 104 has only been attached to a single animal. The male portion 102 in this example could be re-used with a different/new female portion 104. In other examples, other types of one-time use configurations can be used. In an example, the flange 216 extends radially outward from the middle portion 212 of the shaft 202 a distance which provides a sufficient structure to contact the one or more tabs 606, without being large enough to hinder sliding of the shaft 202 through the opening during attachment. In an example, the flange 216 extends radially outward less than 0.25 inches from the middle portion 212.

In examples where the one or more sharp edges on the male portion 102 have a broadhead form, the flange 216 proximate the base 504 of the broadhead form can contact the one or more tabs 606 and hold the male portion 102 connected to the female portion 104 in the same manner as described above. This contact can also provide the single-use security described above.

In another example, the male portion 102 includes one or more features (e.g., tabs) that break upon disconnection with the female portion 104, such that subsequent connection of the male portion 102 to a female portion 104 fails or is significantly impaired. In such an example, security is provided to the male portion 102 of the tag 100. Accordingly, the single-use connection of the tag 100 can ensure either the male portion 102 of the tag 100 cannot be re-used, the female portion 104 of the tag 100 cannot be re-used, or both. In an example where both the male portion 102 and the female portion 104 include tabs providing single-use security, the tabs on the male portion 102 and the female portion 104 respectively can interlock with one another during connection.

Reusable Connection

In an example, the male portion 102 and female portion 104 can form a reusable connection, such that the male portion 102 can be connected to a female portion 104, subsequently disconnected, and then reconnected once again. In an example, there can be multiple versions of the female portion 104 and/or the male portion 102. A first version of either the female portion 104 or the male portion 102 can provide a tamperproof connection and a second version can provide a reusable connection. The male portion 102 and/or female portion 104 can be configured such that a given one (e.g., male portion 102) can connect with either the tamperproof version or the reusable version of the other one (e.g., the female portion 104).

Enclosed Sharp Edge(s)

Advantageously, the flange 216 and the recess 602 can also provide a cover for the one or more sharp edges 208 while the male portion 102 is connected to the female portion 104. Once the male portion 102 has been inserted through the skin of an animal and connected to the female portion 104, the one or more sharp edges 208 can be completely contained within the recess 602, and the recess opening can be generally covered by the flange 216. Thus, the one or more sharp edges 208 can be enclosed during connection with the female portion 104. This can reduce the likelihood of the one or more sharp edges 208 unintendedly cutting into any items, such as the animal, while the tag 100 is attached to the animal. The flange 216 can have a size that extends out at least as far as the ends of the one or more sharp edges 208 that are proximate the base 504, such that the flange 216 covers the backside of the one or more sharp edges 208 to reduce their ability to come into contact with anything from the base-side.

Stop Surface on Female Portion

A surface 608 can extend radially outward from the recess 602 with respect to the longitudinal axis 218 of the shaft 202 to provide a stop that prevents the male portion 202 from moving back out through the opening in the skin once the male portion 102 is connected to the female portion 104. The surface 608 can extend outward at least 0.5 inches farther than an outer surface of the middle portion 212 of the shaft 202 and/or the mouth of the recess 602. The surface 608 can extend outward on opposing sides of the recess 602 and/or in an otherwise distributed manner around the recess 602 to provide a sufficient stopping surface. In an example, the surface 608 extends out around the entire circumference of the recess 602 as shown in FIG. 6 and is incorporated into a label surface 604.

Label Surface(s) on Female Portion

The female portion 104 can also include a label surface 604 for disposing of a visual identifier. The label surface 604 is a surface having a sufficient size, geometry, and location to allow one or more symbols disposed thereon to be viewed by a user while the tag 100 is attached to an animal. In the example shown in FIG. 6, the label surface 604 is a generally planar surface that extends outward from the recess 602. The label surface 604 is preferably at least 1 square inch in area to allow for symbol(s) of a sufficient size to be placed thereon, such that the symbol(s) can be viewed from a reasonable distance (several feet) by an unaided observer. A planar label surface 604 enables easy application of the symbol(s) (e.g., if they are written by hand) and allows all symbol(s) to be viewed by an observer from a single direction. The cross-sectional shape of the example label surface 604 shown in FIG. 6 is generally triangular, however, any suitable cross-sectional shape can be used. The label surface 604 can be physically integrated with the structure of the female portion 104 that defines the recess 602. By integrating the label surface 604 with the recess 602, the enhanced security provided by the single-use constraint of the recess 602 apply to the label surface 604. Accordingly, one can feel confident that that label surface 604 and its corresponding identifier have only been used for a single animal.

Figure 7:
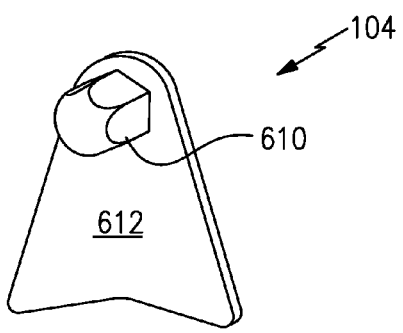
FIG. 7 is another example perspective view of the female portion of FIG. 6.

FIG. 7 is another perspective view of the female portion 104 showing the reverse side of the female portion 104 as was shown in FIG. 6. A head 610 can be formed of a reverse side of the recess 604. The head 610 can have an appropriate geometry such that it can fit in a socket. For example, the head 610 has a hexagonal right prism geometry such that the head 610 (and corresponding female portion 104) can be mated with and twisted by (or held to resist twisting by) a corresponding socket. Other geometries for the head 610 can also be used including a square or other right prism. In other examples, the head 610 can define a socket (e.g., a hex or star shaped socket) such that the head 610 can be mated with and twisted by a matching bit. In an example, the head 610 of the female portion 104 is held in place by a socket or bit while the male portion 102 is rotated through a flap of skin of an animal and into the recess 602 to connect the male portion 102 to the female portion 104.

As shown, a second label surface 612 can exist reverse of the first label surface 604. The second label surface 612 can be used to display the same identifier as present on the first label surface 604, such that the identifier is viewable by an observer from either side of the tag 100. The second label surface 612 can be generally planar, or can be another shape as desired.

In an example, a different identifier can be used on the label surface(s) 604, 612 of the female portion 104 than is used on the label surface(s) 214, 220 of the male portion 102. For example, an identifier for which more security is desired, (e.g., a state ID) can be disposed on the label surfaces 604, 612 of the female portion 104, and another identifier (e.g., an owner ID) can be disposed on the label surfaces 214, 220 of the male portion 102.

Materials

The male portion 102 and female portion 104 can be composed of any suitable material that is sufficiently strong and durable to withstand being attached to the target animal (e.g., in the dewlap or brisket region) while the target animal goes through its normal activities. In an example, the male portion 102 and the female portion 104 are composed of plastic, with the one or more sharp edges 208 composed of metal. In other examples, the female portion 104 and the male portion 102 can be composed of any one or more of plastic, metal (e.g., aluminum), or other suitable material. The one or more sharp edges 208 can be composed of the same material or a different material than the shaft 202 of the male portion 102. The shaft 202 of the male portion 102 can be solid or hollow.

Attachment of Tag to Animal

Figure 8:
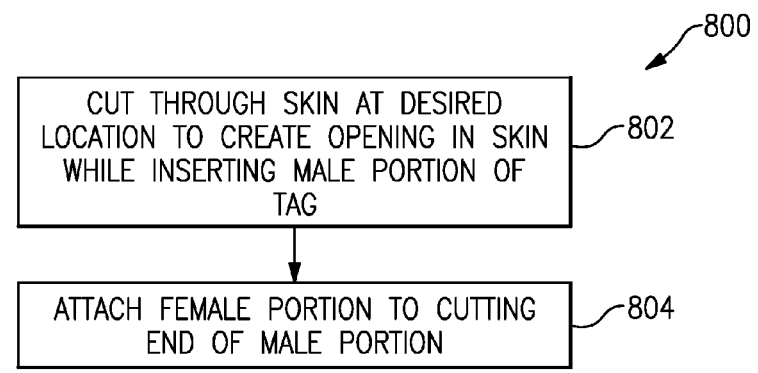
FIG. 8 is a flow diagram of an example method of attaching the tag of FIG. 1 to an animal.

FIG. 8 is a flow diagram of an example method 800 of attaching the tag 100 to an animal. At a high level, the male portion 102 is inserted through the skin of an animal (block 802) and then connected to the female portion 104 (block 804). To insert the male portion 102 through the skin of an animal (block 802), the second end 210 of the male portion 102 having the one or more sharp edges 208 thereon is brought into contact with the skin at the desired attachment location (e.g., the dewlap or brisket region of a cow) and is pushed against the skin. This causes the one or more sharp edges 208 to cut into the skin and create an opening. Since the one or more sharp edges 208 may not actually remove any skin while cutting (i.e., the edges 208 may merely make cuts through the skin), the opening created could re-close if the male portion 102 were removed from the opening. As such, the opening may or may not be self-supporting, in that the material around the opening holds itself apart to create a space therebetween.

In examples where the one or more sharp edges 208 have a helical form, the male portion 102 can be rotated about the longitudinal axis 218 of the male portion 102 while the one or more sharp edges 208 are pushed against the skin. The direction of rotation can correspond to the direction that the helical form wraps around the second end 210 of the shaft 202. The rotation combined with the force against the skin causes the one or more sharp edges 208 to cut into the skin.

The male portion 102 is continued rotating and pushing through the flap of skin until the second end 210 extends out from the reverse side of the flap of skin. In an example, rotation of the male portion 102 can be in the range of 300 to 1,500 rotations per minute (RPM) and can be driven by a powered drill.

In examples where the one or more sharp edges 208 have a broadhead form, the second end 210 can be pushed against the skin with or without rotating, causing the straight edges of the broadhead form to pierce into the skin. The male portion 102 can be continued pushing through the flap of skin until the second end 210 extends out from the reverse side of the flap of skin. In an implementation of such an example, the one or more sharp edges 208 having a broadhead form can be pushed through the skin with a tool, such as a tool that uses mechanical leverage or releases pneumatic pressure to push (e.g., shoot) the male portion 102 through the skin. The pneumatic pressure can "shoot" the shaft 202 of the male portion 102 through the flap of skin until the second end 210 extends out from the reverse side of the flap of skin and contacts the female portion 104 being held on the reverse side of the skin.

With the male portion 102 fully inserted, the one or more sharp edges 208 are external to the flap of skin and the middle portion 212 (or a portion thereof) is within the internal space of the newly formed opening. The female portion 102 can then be connected (block 804) to the second end 210 of the male portion 102 by pressing the second end 210 of the male portion 102 into the recess 602 of the female portion 102.

In an example, the male portion 102 and the female portion 104 can be installed on and held by a tool in an opposing relationship, with the second end 210 of the male portion 104 aligned with the recess 602 of the female portion 104. The tool can then be positioned with the flap of skin between the second end 210 of the male portion 102 and the recess 602 of the female portion 104. The tool can then be activated to push (e.g., rotate, mechanically push, or pneumatically shoot) the male portion 102 through the flap of skin and into the recess 602 of the female portion 104, thereby inserting the male portion 102 through the flap of skin and connecting the female portion 104 in a single motion. An example of an attachment tool for the tag 100 is provided in the co-pending U.S. patent application Ser. No. 15/670,215, titled "ANIMAL TAG ATTACHMENT TOOL", which is hereby incorporated herein by reference.

Other Items Included in Tag

Other items can be included in the tag 100. In an example, a radio frequency identification (RFID) circuit is included in the tag 100. An RFID circuit can be integrated into the male portion 102, the female portion 104, or the male portion 102 and the female portion 104 can each include a portion of the RFID circuit, completing the RFID circuit upon connection of the male portion 102 to the female portion 104. The RFID circuit can store identification information, as well as other information, such as any location(s) that an animal has been. The RFID circuit can respond with the information upon being energized by a signal from an RFID reader. In an example, the RFID circuit is disposed at least partially (e.g., completely) in or on the female portion 104 of the tag 100 such that the single use security of the female portion 104 applies to the RFID circuit.

In an example, a heat sensor is included in the tag 100. Since the middle portion 212 of the shaft 202 is under the skin of the animal, the middle portion 212 may be in a good position to sense a temperature of the animal. Accordingly, a heat sensor can be included in the tag 100 and can be disposed to sense the temperature proximate the middle portion 212 of the tag 100. The heat sensor can include one or more heat sensing surfaces on the outside of the middle portion 212 to sense the temperature of the animal (e.g., the portion under the skin) contacting the middle portion 212.

In an example, other sensors can be included in the tag 100, such as a global navigation satellite system (GNSS) receiver (e.g., GPS, Galileo, GLONASS), a proximity sensor to sense when the animal is in proximity to a corresponding beacon or the like, an inertial motion sensor (e.g., accelerometer, gyroscope), a light sensor, an atmospheric temperature sensor, or other sensor. Another example sensor that can be include in the tag 100 is a connection sensor that senses and outputs an indication of whether the female portion 104 is connected to the male portion 102. Such a connection sensor can include a capacitive sensor that can sense a difference in capacitance between the female portion 104 being connected and the female portion 104 being disconnected.

In an example, a tracking unit can be incorporated into the tag to track the movement of the animal. The tracking unit can interact with other circuitry in the tag (e.g., the RFID tag, GNSS receiver, inertial movement sensors) to acquire movement and/or locations of the animal. The tracking unit can then read out the movement and/or locations to another device as appropriate.

In an example, a wireless transmitter can be included in the tag 100 to send and receive information. The wireless transmitter can be any appropriate wireless transmitter configured to communicate over any appropriate wireless spectrum or protocol including a cellular transmitter to communicate using a cellular communication protocol (e.g., long term evolution (LTE), WiMax, GSM, GPRS, EDGE, short message service (SMS)) to send and receive signals to and from a cellular communication tower, a local area network transmitter to communicate using a wireless LAN protocol (e.g., IEEE 802.1), a personal area network (PAN) transmitter to communicate using a PAN protocol (e.g., Bluetooth), a two-way Internet Protocol (IP) radio, or other transmitter. The wireless transmitter can be configured to communicate with a tower, access point, or directly to a mobile device to send information stored in a storage device of the tag 100 or available to the one or more processing devices (discussed below) of the tag 100 to a remote device (e.g., the mobile device). The information can include identification information for the animal, properties at which the animal has been located, as well as information obtained by sensors in the tag 100, such as the heat sensor or GNSS receiver discussed above. The wireless transmitter can also be used to receive information to store in (a storage device of) the tag 100. This information can include an updated or new identification number, property information for the animal, or other information.

In an example, the tag 100 can include one or more processing devices coupled to memory. The one or more processing devices can include one or more of any appropriate processor including a micro-processor, a special-purpose processor (e.g., a digital signal processor (DSP) or graphics processing unit (GPU), programmable logic (e.g., a field programmable logic array (FPGA)), or the like). Memory can include any suitable form of random access memory (RAM) now known or later developed, such as dynamic random-access memory (DRAM), as well as other types of memory. The tag 100 can also include one or more data storage mediums coupled to the one or more processing devices. The one or more data storage mediums can include any suitable computer readable medium providing non-volatile data storage including, but not limited to, magnetic media such as a hard disk drive (HDD) and non-volatile electric media such as a solid-state drive (SSD), flash media, or EEPROM. The tag 100 includes instructions stored or otherwise embodied on its respective one or more data storage mediums. The instructions, when executed or loaded into the one or more processing devices of the tag 100, cause the tag 100 to perform the actions coded in the instructions, such as the actions of the tag 100 described herein.

The one or more processing devices can be coupled to any wireless transmitter, sensor, or other circuits of the tag 100 to enable performance of the actions described herein. For example, the instructions can cause the one or more processing devices to periodically send, via the wireless transmitter, information such as the current location, temperature reading of the heat sensor, or other information, to a remote device via the wireless transmitter. The instructions can also cause the one or more processing devices to receive a request for information via the wireless transmitter from a remote device and to respond with the requested information via the wireless transmitter.

In an example, the tag 100 can include one or more power sources for any sensor, transmitter, processing device, etc., included in the tag 100. The power source can be one or more of an energy storage device (e.g., a replaceable battery, a re-chargeable battery, long term storage capacitor), a photovoltaic (solar) cell, a micro-kinetic generator (i.e., a device that generates electricity from motion of the device), or other power source. Any sensors, transmitters, processing devices, memory, data storage devices, or RFID circuit in the tag 100 can be electrically coupled to the power source to obtain power therefrom.

The RFID circuit, wireless transmitter, sensor, and power source can be disposed at any appropriate location in the tag 100. In an example, the RFID circuit, wireless transmitter, sensor, and/or power source or a portion thereof is disposed in a hollow chamber within the shaft 202. In such an example, the shaft 202 has an appropriate size and geometry for the RFID circuit, wireless transmitter, sensor, and/or power source or a portion thereof. In an example, the head 204 of the male portion 102 includes a cap that can be opened to access one or more hollow chambers within the shaft 202. In an example, the hollow chamber(s) can be accessed by disconnecting the one or more sharp edges 208 from the shaft 202, where the one or more sharp edges 208 are connected to the shaft 202 in a non-permanent manner. Accessing the one or more hollow chamber(s) by disconnecting the one or more sharp edges 208 can prevent access to the hollow chamber(s) unless the male portion 102 is disconnected from the female portion 104. In an example, the hollow chamber(s) can be accessed by removing a cap on the head 204 of the male portion 102. By including the cap on the head 204 of the male portion 102, the cap can be opened to access the one or more hollow chambers while the tag 100 is attached to an animal.

The hollow chambers can include one or more replaceable items, such as one or more replaceable batteries used as at least a portion of the power source, or a replaceable RFID circuit. In an example, the one or more hollow chambers can include two cylindrical chambers, each cylindrical chamber configured to have a standard cylindrical replaceable battery disposed therein.

Advantageously, the tag 100 disclosed herein can conform to government regulations such that it can be used as a government issued livestock tag.

What is claimed is:

1. An identification tag for an animal, the tag comprising:
a male portion defining:
a shaft;
an enlarged portion proximate a first end of the shaft; and
one or more sharp edges on a second end of the shaft, the one or more sharp edges oriented to cut a pathway for the shaft through material contacting the second end of the shaft, wherein the second end has a conical geometry and the one or more sharp edges include a helical edge disposed on the conical geometry;
a female portion defining a recess, the recess configured to connect to the second end of the male portion.

2. The identification tag of claim 1, wherein the shaft includes a middle portion extending between the enlarged portion and the one or more sharp edges, wherein the enlarged portion extends outward at least 0.5 inches from the middle portion of the shaft, perpendicular to a longitudinal axis of the shaft,
wherein an outer diameter of the female portion is at least 0.5 inches larger than an outer diameter of the middle portion of the shaft, the outer diameter of the female portion and the outer diameter of the middle portion defined perpendicular to the longitudinal axis.

3. The identification tag of claim 2, wherein the middle portion has a consistent diameter varying less than 0.25 inches from the one or more sharp edges to the enlarged portion.

4. The identification tag of claim 3, wherein a distance between the one or more sharp edges proximate the middle portion of the shaft, along a line perpendicular to and extending through a central longitudinal axis of the shaft, is within 0.25 inches of a diameter of the middle portion proximate the one or more sharp edges.

5. The identification tag of claim 1, wherein the one or more sharp edges extend less than 1 inch along the shaft from the second end towards the first end, wherein the middle portion extends at least 1 inch along the shaft from the one or more sharp edges to the enlarged portion.

6. The identification tag of claim 1, wherein the one or more sharp edges extend less than 0.5 inches along the shaft from the second end towards the first end.

7. The identification tag of claim 1, wherein the female portion forms a single-use connection with the male portion.

8. The identification tag of claim 7, wherein the single-use connection includes at least one tab extending within the recess of the female portion, wherein the at least one tab flexes to allow the second end of the male portion to connect to the female portion, and breaks upon disconnection of the male portion from the female portion.

9. The identification tag of claim 1, comprising one or more of:
a radio frequency identification (RFID) circuit; and
one or more label surfaces having an area of at least 1 square inch for disposing of a visual identifier.

10. The identification tag of claim 9, wherein at least one of the one or more label surfaces is integral with the female portion.

11. The identification tag of claim 9, wherein at least one of the one or more label surfaces extends from the male portion.

12. The identification tag of claim 1, wherein a middle portion of the shaft between the enlarged portion and the one or more sharp edges has an outer surface without sharp edges.

13. The identification tag of claim 1, wherein the enlarged portion proximate the first end of the shaft has an outer surface with a right prism geometry for mating with a socket and having torque applied thereto, the torque about a longitudinal axis of the shaft.

14. The identification tag of claim 13, wherein the female portion defines an outer surface concentric with the longitudinal axis of the shaft of the male portion while the male portion is connected to the female portion, the outer surface having a right prism geometry for mating with a socket, such that the socket can hold the female portion rotationally stationary about the longitudinal axis of the shaft while the male portion is rotated about the longitudinal axis.

15. An identification tag for an animal, the tag comprising:
a male portion defining:
an elongated member;
a head proximate a first end of the elongated member;
a cutting member on a second end of the elongated member, the cutting member having a helical form disposed on a conical body; and
a middle portion of the elongated member between the head and the cutting member;
a female portion that engages the second end of the male portion to secure the female portion to the male portion; and
one or more of:
a radio frequency identification (RFID) circuit; and
a label surface having an area of at least 1 square inch for disposing of a visual identifier.

16. The identification tag of claim 15, wherein the male portion and the female portion form a single-use connection.

17. The identification tag of claim 16, wherein the single-use connection impairs the female portion from being re-used with any male portion.

18. The identification tag of claim 17, wherein the RFID circuit is at least partially disposed on the female portion.

19. The identification tag of claim 17, wherein the label surface is integral with the female portion.

20. The identification tag of claim 15, wherein the cutting member is composed of metal, the middle portion is composed of plastic, and the female portion is composed of plastic.

21. The identification tag of claim 15, wherein the head of the male portion is configured to mate with a socket or bit for application of torque thereto;
wherein the female portion includes a head that is configured to mate with a socket or bit for resisting rotation as torque is applied to the female portion during connection of the male portion thereto.

22. The identification tag of claim 15, wherein the middle portion of the male portion has a generally smooth outer surface without a cutting edge thereon.

23. An identification tag for an animal, the tag comprising:
a first structure for connecting to a second structure, the first structure including an elongated member having one or more sharp edges on a tip thereof, such that the one or more sharp edges are configured to cut through skin in a dewlap or brisket region of a cow, the first structure including a head for mating with a socket, wherein the first structure is configured to be rotated via the head to cause the one or more sharp edges to cut through the skin, the second structure configured to connect to a free end of the first structure while the first structure extends through the skin to secure the tag to the cow.

24. The identification tag of claim 23, wherein the tip of the first structure has a conical geometry.

\* \* \* \* \*